Jan. 29, 1957
N. MIRONOFF
2,779,857
ARRANGEMENT FOR MACHINING CONDUCTIVE
MATERIAL THROUGH ELECTRIC DISCHARGES
Filed Dec. 21, 1954
2 Sheets—Sheet 2
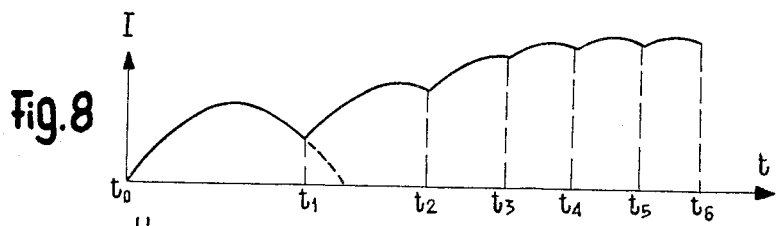
Fig. 8
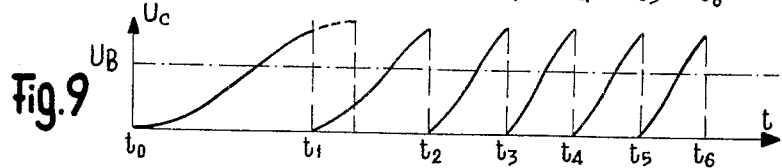
Fig. 9
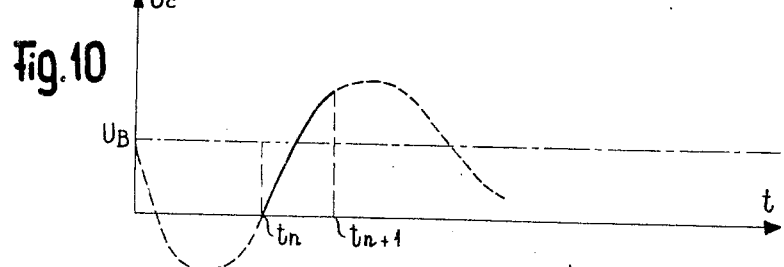
Fig. 10
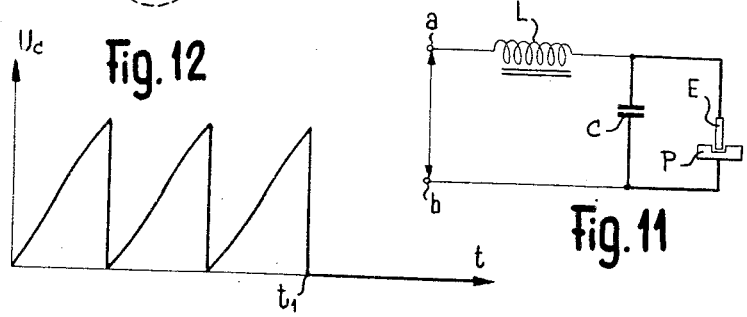
Fig. 12
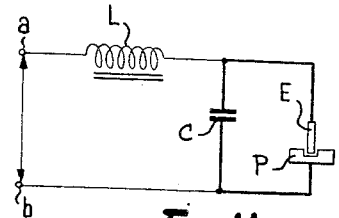
Fig. 11
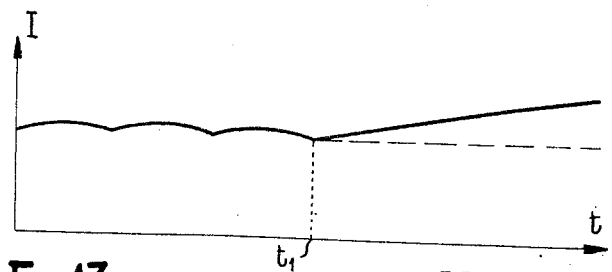
Fig. 13
INVENTOR
Nicolas Mironoff.
BY
ATTORNEY United States Patent Office 2,779,857
Patented Jan. 29, 1957

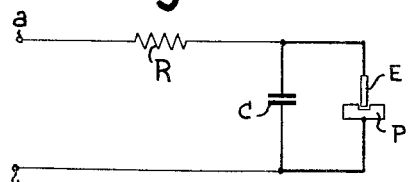
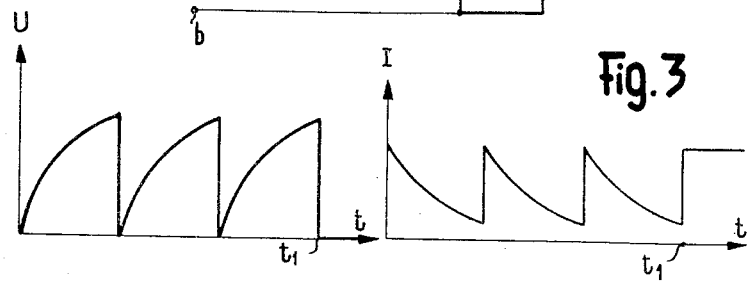
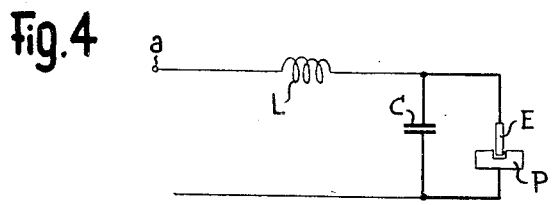
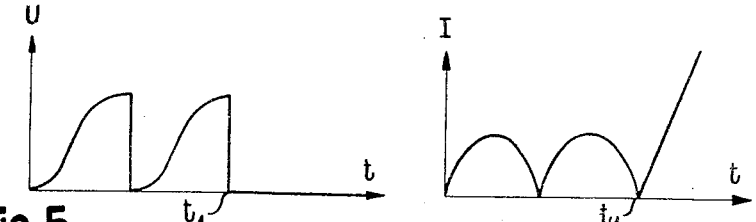
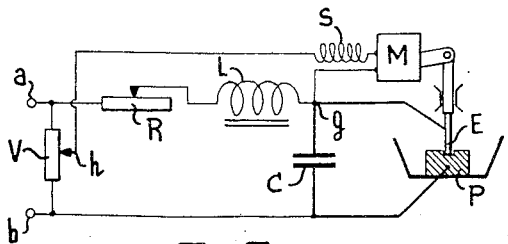

2,779,857

ARRANGEMENT FOR MACHINING CONDUCTIVE MATERIAL THROUGH ELECTRIC DISCHARGES

Nicolas Mironoff, Geneva, Switzerland, assignor to Ateliers des Charmilles S. A., Geneva, Switzerland, a corporation of Switzerland Application December 21, 1954, Serial No. 476,739

Claims priority, application Switzerland August 7, 1954

4 Claims. (Cl. 219—69)

This invention relates to apparatus for the machining of electrically conductive materials by a succession of spark discharges and to the electrical circuitry of said apparatus.

The electric circuits used in all hitherto known arrangements for machining conductive material through electric discharges include generally a condenser connected through its terminals respectively with an operative electrode and with the work to be machined. A supply of direct current is provided for the charging of the condenser through resistances of a generally ohmic nature. Said resistances often include, in addition to the ohmic resistance an induction coil. The respective values of these components define the maximum frequency of the discharges. The distance between the operative electrode and the work to be machined is adjusted by a servo-mechanism which is adapted to maintain this distance at a substantially constant value during the machining procedure. Each time the voltage of the condenser reaches a predetermined value depending on the distance between the electrode and the work, a steep-edged spark jumps between the said two parts whereby a succession of intermittent discharges is obtained. The work to be machined and the operative electrode are immersed inside a dielectric liquid such as kerosene and consequently the spark jumps through said fluid.

It has been found that the grade of the surface machined through such arrangements depends on the energy of the individual shocks, which energy is equal to $\frac{1}{2}CU^2$, C being the capacity of the condenser and U the discharge voltage. Obviously, with a view to obtaining very clean surfaces, one has been led to reduce the energy of each individual shock, either through a reduction of the capacity of the condenser or through a reduction of the voltage applied. But, on the other hand and by reason of the fact that the amount of material removed and consequently the speed of machining depends on the energy of the individual shocks, it is necessary, with a view to obtaining a suitable speed of machining, to increase the frequency of the discharges. Now one of the difficulties met in the machining through electro-eroding methods lies in the fortuitous short-circuits produced either through too great a proximity between the operative electrode and the work, or else through the presence between the two parts of conductive particles. As a matter of fact, the small distance between the electrode and the work, which is of the order of a few hundredths of a millimeter makes such short-circuits very frequent. Such short-circuits speedily develop into an arc, if no special care is taken and they produce thus a welding which affects the machined surface.

If the condenser is charged through a mere ohmic resistance, the short-circuit produces a sudden increase of the current intensity at the point of contact and this leads to serious consequences, which are detrimental to the cleanliness of the machined surface and which are all the more objectionable when the operation is performed under more high-grade machining conditions. Under such circumstances, and taking into account that the response of any servo-mechanism is always slow, the objectionable effects of the short-circuits are always felt. Furthermore, the very speedy widening of the electric contacting surface requires a substantial receding movement of the operative electrode so as to break the short-circuit and consequently the objectionable effects referred to may last a few hundredths of a second and this delay is sufficient to produce substantial damage to the machined surface.

An object of my invention is to provide an apparatus for machining electrically conductive materials by a succession of spark discharges, said apparatus including electrical circuitry therein which reduces the frequency with which short circuits are caused and the objectionable results of such short circuits, such as the welding of the electrode and the work piece and the formation of rough surfaces on said work piece.

Other objects and features will become apparent from the following detailed description.

Figure 1 is a diagram of a conventional apparatus for machining electrically conductive materials by a succession of spark discharges and the electrical circuitry thereof.

Figure 2 is a graph, with reference to the apparatus of Figure 1, showing the modifications in the voltage U across the terminals of condenser C as a function of time $t$, a short circuit between electrode E and workpiece P occurring at a time $t_1$.

Figure 3 is a graph, with reference to the apparatus of Figure 1, showing the variations of the charging current I of the condenser C as a function of time $t$, $t_1$ being the time at which the short circuit occurs.

Figure 4 is a diagram of a prior art apparatus for machining electrically conductive materials by a succession of spark discharges and the electrical circuitry thereof, said apparatus including an induction coil L in place of the resistance R of Figure 1.

Figure 5 is a graph, with reference to the apparatus of Figure 4 under normal operating conditions, showing the variations of the voltage U across the terminals of condenser C as a function of the time $t$, a short circuit forming between the electrode E and the workpiece P at the time $t_1$.

Figure 6 is a graph, with reference to the apparatus of Figure 4 under normal operating conditions, showing the variations of the charging current I of the condenser C as a function of the time $t$, $t_1$ being the time at which the short circuit occurs.

Figure 7 is a diagram of the preferred embodiment of my apparatus of this invention for machining electrically conductive materials by a succession of spark discharges including the electrical circuitry thereof.

Figure 8 is a graph illustrating the variations of the current I charging the condenser C as a function of the time $t$, with reference to the apparatus of Figure 7.

Figure 9 is a graph illustrating the voltages U across the terminals of the condenser C as a function of the time $t$, with reference to the apparatus of Figure 7.

Figure 10 is a graph, with reference to the apparatus of Figure 7, showing the average voltage U obtained across the terminals of the condenser C between two successive discharges at the times $t_n$ and $t_{n+1}$, respectively.

Figure 11 is a simplified wiring diagram of a circuit including only an untuned induction coil L and serving for the charging of the condenser C.

Figure 12 is a graph, with reference to the apparatus of Figure 11, illustrating the voltage U across the condenser C as a function of the time $t$, $t_1$ being the time at which the short circuit occurs between the electrode E and the workpiece P.

Figure 13 is a graph, with reference to the apparatus of Figure 11, illustrating the variations of the charging current I of the condenser C as a function of the time $t$, $t_1$ being the time at which the short circuit occurs between the electrode E and the workpiece P.

Referring to Figure 1, here is set forth a circuit wherein the charging of the condenser C is performed through a resistance R while the supply of direct current is connected across the terminals $a$ and $b$. The condenser discharges across the space separating the electrode E from the work to be machined P.

Referring to Figures 2 and 3, respectively, it is assumed that a short circuit between the electrode E and the workpiece P occurs at the time $t_1$, and the current I retains the instantaneous peak value, which it reaches at each recharging of the condenser C, at the time $t_1$ at which the short circuit occurs.

The disadvantages of the apparatus having a circuit including only an ohmic resistance R, as shown in Figure 1, through which the condenser is charged are obvious: high frequency of the short-circuit and, at each short-circuit, a sudden inflow of current into the discharge circuit, which increases the detrimental action of such short-circuits. Furthermore, it is very difficult to obtain high machining frequencies while retaining the same energy for each discharge of the condenser since it is necessary, with a view to obtaining a shorter time for the recharging of the condenser C, either to increase the voltage of the supply circuit or else to reduce the value of the resistance R. Both these steps have for their result an increase of the short-circuit current which cuts out the possibility of a careful machining.

Referring to Figure 4 the coil L forms an oscillating circuit with the condenser C and the half-period of natural oscillation of said circuit is substantially equal to the period separating two successive discharges. The induction coil L is consequently tuned and, if the ohmic resistance of said induction coil is negligible, the discharges are produced for a substantially zero charging current, as may be provided with a view to avoiding short-circuits. Furthermore, the peak voltage of the condenser C rises in practice to a value equal to twice the feed voltage $U_B$. The use of such an induction coil is therefore of advantage since it does not dissipate a fraction of the charging power of the condenser.

Referring to Figures 5 and 6, it is apparent that, at the moment of the short-circuit, the current charging the condenser which forms then the short-circuit current between the electrode and the work to be machined does not increase instantaneously so as to assume a constant value as in the preceding case of a charging through a resistance; in contradistinction, it increases according to a linear law, $$L \frac{dI}{dt}$$

being equal to the feed voltage. During a time interval equal to that separating two successive discharges, the short-circuit current reaches an intensity which is substantially equal to three times its peak value during normal operation. The speedy increase of the short-circuit current does not allow, in this case as before, obtaining in a simple manner high machining frequencies. With a view to limiting the value of the short-circuit current, one is led to insert a resistance in the charging circuit or else, to resort to suitable electronic means with a view to opposing the feeding voltage $U_B$. Furthermore, in order to reach high frequencies which are essential for the obtention of a high grade and speedy machining, prior manufacturers have developed electronic servo-mechanisms adapted to control the receding motion of the electrode under high speed response conditions in the case of a short-circuit. These auxiliary mechanisms are intricate, delicate and especially very expensive.

Elementary calculation shows that the normal working at a more or less high frequency requires, in the case of a tuned induction coil, a substantial reduction of its inductance and this inductance value of the tuned induction coil becomes, in the case of high frequencies, so small that its useful effect is no longer perceptible. Furthermore, experience shows that for each combination of the values assumed by the condenser capacity, by the voltage and also by the size and shape of the operative electrode, there exists a physical limitation for the frequencies beyond which the conditions of de-ionizing of the discharge channels are disturbed and the machining cannot continue smoothly. The most logical conditions of machining are consequently those which allow reaching the said limit frequency without rising beyond same, because, at this moment, the maximum allowable machining power is used for the combined conditions to be considered.

Here, in my invention the induction coil has a value sufficient for the natural half-period of the charging circuit of the condenser to be equal to at least twice the period of discharge, while the servo-mechanism is controlled by a voltage which is a predetermined function of the average voltage between the electrode and the work, the arrangement being such that it limits the speed of modification of the charging current following a modification of the said average voltage while ensuring a rapid response of the servo-mechanism.

Referring to Fig. 7, a source of direct current voltage, which is not illustrated, is connected across the terminals $ab$ with a view to charging a condenser C through a variable resistance R and an induction coil L. The terminals of the condenser C are connected respectively with the work to be machined P and with an operative electrode E. The spacing between the work P and the electrode E is controlled by the servo-mechanism M which is responsive to a control voltage tapped off between one terminal $g$ of the condenser and the slider $h$ on a potentiometer V. This control voltage, which is equal to the difference between the voltage between the electrode and the work and the reference voltage provided by the potentiometer V assumes a saw tooth shape. For this reason, there is inserted in the circuit feeding the said control voltage to the servo-mechanism M an inductance S so as to damp the alternating component of the said voltage.

When the spacing between the electrode E and the work P becomes too small, the peak voltage of the condenser C for which the discharge is produced, sinks. The average voltage across the terminals of the condenser also sinks and the response of the servo-mechanism is such that it increases the distance between P and E and restores the discharge voltage to its predetermined value which is twice that of the voltage tapped off at $h$. Conversely, if the distance E—P increases, the servo-mechanism operates in the opposite direction. It should be remarked that the fact of controlling the servo-mechanism by means of a voltage which depends on the actual discharge voltage of the condenser allows a very speedy response of the said mechanism in spite of a slow modification of the charging current.

The conventional servo-mechanisms used in arrangements of the type considered, are generally of an electromagnetic, pneumatic or hydraulic type. If no special care were taken in the condenser-charging circuit, the servo-mechanism would not be capable of removing the short-circuit before an objectionable effect has already occurred on the surface of the machined work, such as a crater, traces of welding, etc.

All the modifications in the conditions governing the discharge lead to modifications in the voltage tapped off across the terminals of the condenser and which serves for controlling the servo-mechanism.

On the other hand, by reason of the presence of a large inductance in the condenser charging circuit, any increase or reduction in the current intensity feeding the condenser is damped, which leaves the servo-mechanism enough time to respond efficiently.

This allows the servo-mechanism to retain the predetermined voltage throughout the machining and, in the case of a short-circuit, the said machining is cut off before any substantial increase in current has occurred.

Referring to Figures 8 and 9, at the time $t_0$, the voltage $U_B$ is applied across the terminals $a$ and $b$ and the current I passes through the circuit so as to charge the condenser C. If there were no sparking between the electrode and the work, the current would assume the shape of a damped sinusoid and the voltage across the terminals of the condenser C would also be illustrated by a damped sinusoid, with a lag in phase with reference to the intensity sinusoid. These two curves have been drawn in Figs. 8 and 9 throughout an interval equal to one half the period of oscillation of the circuit L—C.

At the time $t_1$, i. e. slightly before the end of this half-period, the condenser is discharged. It is apparent that the voltage across the terminals of the condenser is then almost equal to twice the voltage $U_B$ applied across the terminals $ab$. At this moment, the current intensity I is no longer equal to zero and consequently, at the end of the discharge period of the condenser C, the current increases again as defined by the arc of a damped sinusoid while the voltage $U_c$ increases more rapidly.

At the time $t_2$, another discharge occurs and at this moment, the value of the intensity is higher than at the moment $t_1$.

A sequence of discharges occurs at successive times $t_3$, $t_4$ . . . etc. and the slope of the curve of condenser voltage becomes steeper and steeper until it reaches a slope similar to that shown in an approximate manner between $t_5$ and $t_6$. The intensity of current I reaches then a limit value which is substantially constant and the curve of intensities between two successive discharge points is illustrated by an arc of a damped sinusoid. Since the period of the said sinusoid is large with reference to the time separating two successive discharges, the current includes in practice only an insignificant alternating component.

Referring to Figure 10, I have illustrated in dotted lines the damped sinusoidal curve of which a part is followed by the voltage $U_c$ between the said two discharges.

Referring to Figures 11, 12 and 13, it is apparent that at the moment of the short-circuit, the increase in intensity is very slow and that a duration corresponding to the production of a large number of discharges elapses until the current reaches a value double that of the average current. It is therefore unnecessary to resort to a particularly quick operating auxiliary mechanism and the receding movement of the electrode may be small since it occurs at a moment at which the current is but little higher than the average current and consequently the cutting out of the short-circuit leads to no difficulty.

The following example illustrates the conditions of operation both with a circuit including a tuned induction coil and with a circuit including an untuned induction coil while resorting to the same machining power. In this example:

Peak voltage for the condenser = 200 v.
Charging current = 1 a.
Power = 100 w.

| Tuned induction coil circuit | Untuned induction coil circuit |
| --- | --- |
| L=0.4 H; C=100 mf. Frequency=50 cycles L=0.04 H; C=10 mf. Frequency=500 cycles L=0.004 H; C=1 mf. Frequency=5,000 cycles L=0.0004 H; C=0.1 mf. Frequency 50,000 cycles | L=1 H; C=0.1 mf. Frequency=50,000 cycles (which is the above-mentioned physical limit of discharge frequencies) |

It is apparent that in order to reach the physical limit of discharge frequencies with a view to obtaining the highest possible machining efficiency for a predetermined power, it is necessary with a tuned induction coil circuit to resort to an induction coil of very low inductance and this deprives in practice the circuit of the advantages provided by a reaction element.

In the above-referred to example, this limit value of the inductance is equal to about 0.01 h. Consequently, the efficiency of a tuned induction coil is obtained only up to a frequency of about 2000 discharges per second. Now, the physical limit of frequencies under such conditions reaches about 50,000 discharges per second, which limit is reached without any difficulty with a circuit including an untuned induction coil.

In brief, it may be stated that the tuned induction coil shows the following drawbacks:

1. Necessity of retuning for any change in the rating or in the machining power.
2. Difficulty of priming the discharges without a special control device.
3. For all frequencies and particularly for high discharge frequencies, the value of the inductance of the tuned induction coil is of necessity small and although at the moment of the short-circuit the charging intensity is theoretically equal to zero, said current increases so speedily that the servo-mechanism, even if of the most perfect type, has no time to become responsive (compare the slope $$\frac{dI}{dT}$$

in the two cases).

The use of a large untuned induction coil provides consequently the following advantages:

1. At the moment of a short-circuit, the current is equal to the charge current of the condenser and consequently to the average current required for machining. This current increases slowly with time, which allows the servo-mechanism to interfere before said short-circuit reaches a dangerous value and develops into a welding current, this action of the servo-mechanism consisting in slightly withdrawing the operative electrode, which limits the duration of the short-circuit to a few thousandths of a second.
2. The discharges follow one another regularly and uninterruptedly since the voltage of the condenser rises until a discharge is obtained and experience shows that such a voltage does not rise beyond about 15% of the average voltage, which fraction corresponds to a maintenance of the current within predetermined allowed limits during the machining.
3. Benefit is also taken of the advantages of an increase in the efficiency of the machine as a consequence of the automatic doubling of the voltage.
4. Most of the short-circuits are quenched as soon as they appear through the powerful action of the large induction coil limiting the inflow of current into the charging circuit of the condenser, which allows thus automatically extinguishing the ionizing channels even without any interference of the servo-mechanism being necessary.
5. All these advantages allow raising substantially the physical limit of the discharge frequency.

Lastly, I may give out by way of an exemplification the values of the elements appearing in Fig. 7, which values ensure excellent operative conditions for a fine machining under low power conditions.

Supply of voltage across the terminals $a$ and $b$ = 150 volts
L = 1 h.
R = 50 ohms.
C = 0.1 mf.

The limit machining frequency is about 50,000 discharges per second while the average charging current has an intensity of 1 ampere.

If C is equal to 0.01 mf. and R is equal to 250 ohms, the other values remaining unchanged, I obtain a limit frequency of about 100,000 discharges per second with an average charging current of 0.2 a.

Selecting C = 1 mf. and R = 10 ohms, the other values remaining unchanged, I obtain a limit frequency of about 25,000 discharges per second with an average charging current of 5 amperes.

I claim:

1. An apparatus for machining an electrically conductive workpiece by successive spark discharges, comprising, in combination, a storage condenser adapted to discharge when an electrode and a workpiece connected thereacross are separated by an insulating medium; a circuit for charging said condenser including a direct current source, an induction coil in series with said condenser, and a potentiometer in parallel with said condenser, said potentiometer having a slider operatively associated therewith, said condenser having a first terminal member connected to said induction coil and a second terminal member connected to said direct current source, the inductance of said induction coil being of such value that the natural half-period of said charging circuit of said condenser equals at least twice the interval between two successive condenser discharges; a movably mounted electrode electrically connected to said first terminal member, said second terminal member being electrically connected to said workpiece; and servo means for controlling the spacing between said electrode and workpiece, said servo means being operatively connected to said electrode and electrically connected to said first terminal member on one hand and to said slider on the other hand, whereby the voltage drop across said servo means is dependent upon the actual discharge voltage of said condenser thereby causing said servo means to respond immediately to any variation in the voltage drop across the electrode and the workpiece immersed in the insulating medium brought about by the increase or decrease in the spacing therebetween.

2. An apparatus for machining an electrically conductive workpiece by successive spark discharges, comprising, in combination a storage condenser adapted to discharge when an electrode and a workpiece connected thereacross are separated by an insulating medium; a circuit for charging said condenser including a direct current source, an induction coil in series with said condenser, and a potentiometer in parallel with said condenser, said potentiometer having a slider operatively associated therewith, said condenser having a first terminal member connected to said induction coil and a second terminal member connected to said direct current source, the inductance of said induction coil being of such value that the natural half-period of said charging circuit of said condenser equals at least twice the interval between two successive condenser discharges and the ratio of the inductance in henries of the induction coil to the capacity of said condenser in farads being greater than 100,000; a movably mounted electrode electrically connected to said first terminal member, said second terminal member being electrically connected to said workpiece; and servo means for controlling the spacing between said electrode and workpiece, said servo means being operatively connected to said electrode and electrically connected to said first terminal member on one hand and to said slider on the other hand, whereby the voltage drop across said servo means is dependent upon the actual discharge voltage of said condenser thereby causing said servo means to respond immediately to any variation in the voltage drop across the electrode and the workpiece immersed in the insulation medium brought about by the increase or decrease in the spacing therebetween.

3. An apparatus for machining an electrically conductive workpiece by successive spark discharges, comprising, in combination, a storage condenser adapted to discharge when an electrode and a workpiece connected thereacross are separated by an insulating medium; a circuit for charging said condenser including a direct current source, an induction coil in series with said condenser, a variable resistance in series with said induction coil and said condenser, and a potentiometer in parallel with said condenser, said potentiometer having a slider operatively associated therewith, said condenser having a first terminal member connected to said induction coil and a second terminal member connected to said direct current source, the inductance of said induction coil being of such value that the natural half-period of said charging circuit of said condenser equals at least twice the interval between two successive condenser discharges and the ratio of the inductance in henries of the induction coil to the capacity of said condenser in farads being greater than 100,000; a movably mounted electrode electrically connected to said first terminal member, said second terminal member being electrically connected to said workpiece, and servo means for controlling the spacing between said electrode and workpiece, said servo means being operatively connected to said electrode and electrically connected to said first terminal member on one hand and to said slider on the other hand, whereby the voltage drop across said servo means is dependent upon the actual discharge voltage of said condenser thereby causing said servo means to respond immediately to any variation in the voltage drop across the electrode and the workpiece immersed in the insulation medium brought about by the increase or decrease in the spacing therebetween.

4. The apparatus of claim 3 including an inductor in series with said servo means and said slider.

References Cited in the file of this patent

UNITED STATES PATENTS

| 2,132,479 | Holslag | Oct. 1, 1938 |
| 2,145,010 | Kennedy et al. | Jan. 24, 1939 |
| 2,628,330 | Williams | Feb. 10, 1953 |

FOREIGN PATENTS

| 637,793 | Great Britain | May 24, 1950 |